United States Patent Office 3,117,077
Patented Jan. 7, 1964

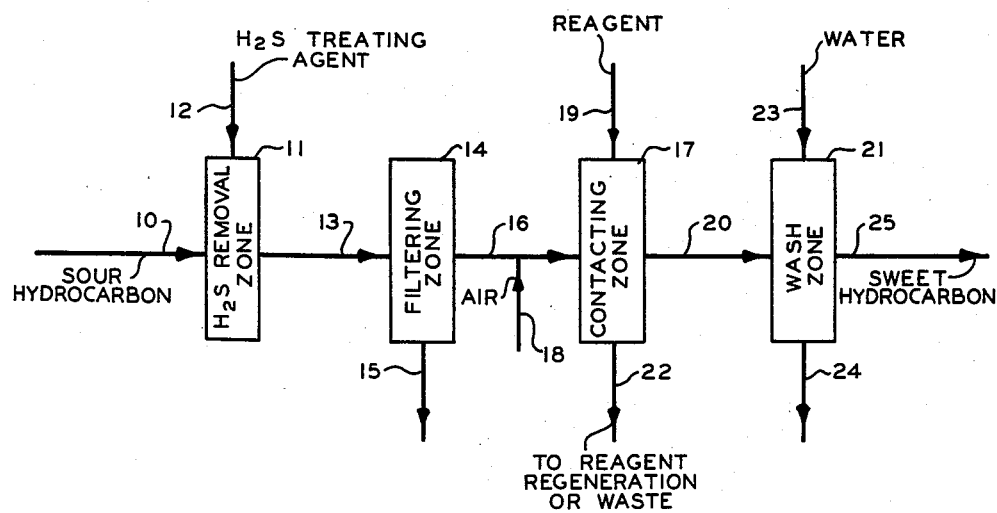

3,117,077
HYDROCARBON SWEETENING
Jesse M. Brooke, Sweeny, Tex., assignor to Phillips
Petroleum Company, a corporation of Delaware
Filed Nov. 14, 1960, Ser. No. 69,008
10 Claims. (Cl. 208—195)

This invention relates to hydrocarbon sweetening and to a reagent therefor.

In one aspect, this invention relates to a process for sweetening hydrocarbons by contacting the hydrocarbon with a solution of cupric chloride in dimethylformamide. In another aspect, this invention relates to a process for sweetening hydrocarbons which comprises removing hydrogen sulfide therefrom and then contacting with a solution of cupric chloride in dimethylforamide. In another aspect, this invention relates to a hydrocarbon sweetening reagent comprising a dimethylforamide solution of cupric chloride.

In the past, small concentrations of mercaptans, such as those naturally occurring in petroleum oils, side distillates, etc., have been oxidized to disulfides by various sweetening methods. One well known method of sweetening comprises treatment of the mercaptan containing hydrocarbon with aqueous cupric chloride, commonly called a copper sweetening process. Although aqueous cupric chloride treatment is a very useful process for hydrocarbon sweetening, I have found that certain color and gum stability problems are associated with the water solution and that such a treatment sometimes results in poor color and gum stability characteristics in the treated hydrocarbon.

It is an object of my invention to provide an efficient hydrocarbon sweetening process. Another object of my invention is to prevent the formation of undesirable color in and to improve the gum stability of the sweetened hydrocarbon.

Other aspects, objects and the several advantages of this invention will be apparent from a study of this disclosure, the drawing and the appended claims.

According to my invention, I provide a process for sweetening hydrocarbons comprising contacting the hydrocarbons with a solution of cupric chloride in dimethylformamide. Further, according to my invention, a hydrocarbon is sweetened by converting mercaptans contained therein to disulfides by contacting with a non-aqueous solution of cupric chloride in dimethylformamide. Also, according to my invention, hydrogen sulfide is removed prior to the treatment with the dimethylformamide solution of cupric chloride. When it is desired to regenerate the reagent concurrently with the mercaptan conversion, air or other free oxygen containing gas is present in the hydrocarbon cupric chloride contacting zone. Further, according to my invention, I have provided a hydrocarbon sweetening process comprising the steps of removing hydrogen sulfide, filtering to remove the hydrogen sulfide removal agent, simultaneously introducing free oxygen and a solution of cupric chloride in dimethylformamide to convert contained mercaptans to disulfides followed by a water wash. Further, according to my invention, I have provided an improved hydrocarbon sweetening reagent comprising up to about 20 weight percent of cupric chloride in solution in dimethylformamide.

The term "sweetening" generally is applied to a process by which undesirable mercaptans remaining in a hydrocarbon after a preliminary treatment to remove hydrogen sulfide are converted into less undesirable compounds possessing a comparatively unobjectionable odor and being comparatively non-corrosive. A very useful process for sweetening hydrocarbons comprises treating the hydrocarbons with an aqueous solution of cupric chloride to convert the objectionable mercaptans contained therein to unobjectionable disulfides. I have found that by utilizing a solution of cupric chloride in dimethylformamide improved color characteristics and gum stability result. The reactions involved in the treatment may be considered to be a reaction of the cupric chloride and the mercaptan to form the disulfide and hydrogen chloride and cuprous chloride followed by a regeneration with oxygen of the cuprous chloride and hydrogen chloride to form cupric chloride and water, or the reaction may be considered to be an oxidation of the mercaptan in the presence of the cupric chloride solution to form the disulfide and water. That is, the equations of the reaction may be written

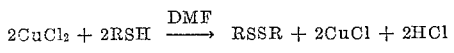
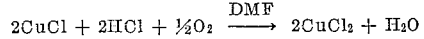

or

In either instance, the final reaction products are the same, disulfide and water. The disulfide is removed as a part of the treated hydrocarbon, while the water goes into solution in the dimethylformamide. To prevent a build-up of water in the contacting zone and a resulting diminishing of the improved result of the present invention which relies upon a reduction of the water present during the reaction, it is necessary to remove water continuously. This can be done by continuously adding dry make-up reagent, a solution of cupric hloride in dimethylformamide, and removing moisture containing reagent from the zone either for regeneration or for disposal as waste.

It is desirable to remove hydrogen sulfide present in the hydrocarbon prior to the mercaptan conversion sweetening step and this may be done by conventional means. For example, this step may be accomplished by a caustic or sodium carbonate treatment followed by a filtering step. It is also desirable to water wash the sweetened hydrocarbon and this also may be accomplished in a conventional manner.

Up to about 20 weight percent of cupric chloride will dissolve in dimethylformamide, and this solution, when contacted with substantially hydrogen sulfide free mercaptan containing hydrocarbon, converts RSH components into RSSR, as described above. There is substantially no loss of dimethylformamide with the hydrocarbon phase and olefins and disulfides are not absorbed into the cupric chloride dimethylformamide reagent in appreciable amounts. Further, the treated products do not need to be sulfide washed to remove copper carry-over nor to be treated with copper reactivator, both of which are conventional steps when using an aqueous chloride solution as the sweetening reagent. Hydrocarbon treated according to my invention does not loose color nor have gum formation, both of which may occur when using aqueous cupric chloride treatment on the same hydrocarbon.

As illustrated in the drawing, a sour hydrocarbon enters through pipe 10 into a hydrogen sulfide removal zone 11 wherein it is contacted with a hydrogen sulfide treating agent, such as caustic or sodium carbonate, which enters through conduit 12. The treated stream is carried through conduit 13 into filtering zone 14 to remove the undesired reaction products therefrom through conduit 15. Filtering zone 14 may, for example, be a sand tower. The substantially hydrogen sulfide free stream, but still containing appreciable amounts of mercaptans, flows through conduit 16 into contacting zone 17. Air or other free oxygen containing gas enters through conduit 18 while the treating reagent, a solution of cupric chloride in dimethylformamide, enters through conduit 19. The sweetened hydrocarbon is carried through conduit 20 into wash zone 21 while the moisture containing reagent is removed through conduit 22 as necessary to maintain the desired water concentration in the contacting zone. Wash water flows into wash zone 21 through conduit 23 and outwardly therefrom through conduit 24 while the sweet hydrocarbon is removed through conduit 25.

The following example is illustrative of the invention.

*Example*

A catalytically cracked gasoline having the following characteristics was used as the sour hydrocarbon.
Catalytically cracked gasoline:

| | |
|---|---|
| API @ 60/60 °F | 67.8 |
| IBP, °F | 102 |
| 50% distilled | 162 |
| End point, °F | 314 |
| RSH sulfur, p.p.m | 90 |

This hydrocarbon, following a sodium carbonate wash for removal of hydrogen sulfide, was charged at the rate of 5 gallons of hydrocarbon per gallon of reagent at a contact time of 5 minutes at 78° F. in the presence of air added to the system. In a phase separation, the hydrocarbon was withdrawn as the upper phase and was subjected to a water wash to produce the final sweetened product. The final RSH sulfur content following this treatment was substantially 0.

In the practice of my invention the sweetened hydrocarbon can be supplied from the copper sweetening step substantially free of water. Since copper compounds which contribute to the instability of the treated product are carried with the water, these compounds also are substantially eliminated from the treated material. In this manner it is possible to eliminate the customary sodium sulfide treatment to remove the copper compounds without increasing the instability of the treated material in storage.

Although, as indicated in the equations illustrating the sweetening reaction, water is formed, since the amount of mercaptan normally present in the hydrocarbon is very small, the amount of the water formed also is very small. For example, in a hydrocarbon containing 90 parts per million RSH, .00004 pound of $H_2O$ per gallon of gasoline is formed. Since the dimethylformamide has a much greater affinitive for the water than does the hydrocarbon being treated, even this very small amount is substantially maintained in the treating reagent, the hydrocarbon leaving the step substantially water free.

To prevent the introduction of water with the hydrocarbon into the treating step, it is desirable to pretreat the feed by passing through a zone such as filtering zone 14 wherein the water may be substantially removed. Of course other types of water removal may be utilized if desired.

Since the amount of water formed is extremely small as compared with the amount of hydrocarbon treated, a very large quantity of such hydrocarbon may be treated with a given charge of sweetening reagent before the water content of the reagent is sufficiently high to require regeneration or discarding. Since the affinitive for water of the dimethylformamide is so much greater than that of the hydrocarbon, an appreciable percentage of water can be tolerated. This simplifies the regeneration step since it is not necessary to treat the reagent to a point at which the water removal becomes very difficult and expensive.

Reasonable variation and modification are possible within the scope of this disclosure, the drawing and the appended claims to the invention the essence of which is a process for sweetening hydrocarbons comprising converting mercaptans contained therein to disulfides by contact with a solution of cupric chloride in dimethylformamide.

I claim:

1. A process for sweetening hydrocarbons which comprises contacting the hydrocarbon with a solution of cupric chloride in dimethylformamide.

2. A process for sweetening mercaptan containing hydrocarbons which comprises converting said mercaptans to disulfides by contacting with a solution of cupric chloride in dimethylformamide.

3. A process for sweetening hydrocarbons which comprises removing hydrogen sulfide therefrom and contacting the substantially hydrogen sulfide free hydrocarbons with a solution of cupric chloride in dimethylformamide.

4. A process for sweetening mercaptan containing hydrocarbons which comprises removing hydrogen sulfide therefrom and contacting the substantially hydrogen sulfide free hydrocarbon with a solution of cupric chloride in dimethylformamide to convert said mercaptans to disulfides.

5. A process for sweetening hydrocarbons which comprises contacting the hydrocarbons with a solution of up to about 20 weight percent of cupric chloride in dimethylformamide in the presence of free oxygen.

6. A process for sweetening mercaptan containing hydrocarbons which comprises converting said mercaptans to disulfides by contacting with a solution of up to about 20 weight percent of cupric chloride in dimethylformamide in the presence of free oxygen.

7. A process for sweetening hydrocarbons which comprises removing hydrogen sulfide therefrom and contacting with a solution of up to about 20 weight percent of cupric chloride in dimethylformamide in the presence of free oxygen.

8. A process for sweetening mercaptan containing hydrocarbons which comprises removing hydrogen sulfide therefrom and converting said mercaptans to disulfides by contacting with a solution of up to about 20 weight percent of cupric chloride in dimethylformamide in the presence of free oxygen.

9. A process for sweetening hydrocarbons which comprises contacting with a hydrogen sulfide removal agent, filtering to remove said agent, contacting the substantially hydrogen sulfide free hydrocarbon with air in the presence of a solution of cupric chloride in dimethylformamide and water washing the treated hydrocarbon.

10. A process for sweetening hydrocarbons which comprises contacting a sour hydrocarbon with a hydrogen sulfide removal agent in a hydrogen sulfide removal zone, removing said agent in a filtering zone, adding air continuously to the treated and filtered stream from said filtering zone, continuously adding a reagent comprising a substantially water free solution of cupric chloride in dimethylformamide into a contacting zone, continuously removing from said contacting zone a treated hydrocarbon stream and a reagent stream thereby removing water formed in the treating and regeneration reaction occurring in said contacting zone, water washing said treated hydrocarbon stream in a washed zone to produce a sweet hydrocarbon product stream.

References Cited in the file of this patent

Pflaum et al.: Analytica Chimica Acta, vol. 13, pp. 165–71, 1955.